(12) United States Patent
Gao et al.

(10) Patent No.: US 8,767,648 B2
(45) Date of Patent: Jul. 1, 2014

(54) METHOD AND DEVICE FOR TRANSMITTING SOUNDING REFERENCE SIGNAL

(75) Inventors: Qiubin Gao, Beijing (CN); Deshan Miu, Beijing (CN); Xueming Pan, Beijing (CN); Zukang Shen, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 121 days.

(21) Appl. No.: 13/260,521

(22) PCT Filed: Mar. 22, 2010

(86) PCT No.: PCT/CN2010/071175
§ 371 (c)(1),
(2), (4) Date: Dec. 13, 2011

(87) PCT Pub. No.: WO2010/108424
PCT Pub. Date: Sep. 30, 2010

(65) Prior Publication Data
US 2012/0127932 A1 May 24, 2012

(30) Foreign Application Priority Data

Mar. 27, 2009 (CN) .......................... 2009 1 0080779
Apr. 15, 2009 (CN) .......................... 2009 1 0134938

(51) Int. Cl.
*H04W 72/04* (2009.01)
*H04L 5/00* (2006.01)

(52) U.S. Cl.
CPC .................................. *H04L 5/0035* (2013.01)
USPC ........................................... 370/329; 455/450

(58) Field of Classification Search
CPC ... H04W 72/04; H04W 72/042; H04W 72/08; H04L 5/0035; H04L 5/0053; H04L 5/0094
USPC ........ 370/203, 328, 343, 344, 480; 455/422.1
See application file for complete search history.

(56) References Cited

U.S. PATENT DOCUMENTS

2008/0247375 A1* 10/2008 Muharemovic et al. ...... 370/344
2010/0142466 A1* 6/2010 Palanki et al. ................ 370/329
2010/0159935 A1* 6/2010 Cai et al. ....................... 455/450
2010/0195532 A1* 8/2010 Pajukoski et al. ............ 370/254

(Continued)

FOREIGN PATENT DOCUMENTS

CN 101 330 325 12/2008
CN 101 384 055 3/2009

(Continued)

*Primary Examiner* — Paul H Masur
(74) *Attorney, Agent, or Firm* — Fay Kaplun & Marcin, LLP (57) ABSTRACT

A method and device for transmitting sounding reference signal (SRS). The method includes that: in at least two cells which need a user equipment (UE) to perform uplink channel sounding, the SRS resources for performing sounding to each cell are distributed to the UE; the UE is indicated to transmit the SRS on the distributed SRS resources. The method of the present invention can enable the UE to detect the channels of a plurality of cells and to be used in multipoint cooperative transmission, avoid the UE feeding back the channel information of a plurality of cells, and reduce the feedback overhead and improve the system performance.

9 Claims, 9 Drawing Sheets

(56) References Cited

U.S. PATENT DOCUMENTS

2010/0309852 A1* 12/2010 Li et al. .................. 370/328
2011/0261716 A1* 10/2011 Kim et al. ................ 370/252
2012/0002568 A1* 1/2012 Tiirola et al. ............. 370/252

FOREIGN PATENT DOCUMENTS

| CN | 101 394 263 | 3/2009 |
| CN | 101 426 268 | 5/2009 |
| WO | 2008/156293 | 12/2008 |

\* cited by examiner

Fig. 1

--Prior Art--

Fig. 2

--Prior Art--

Fig. 3

--Prior Art--

METHOD AND DEVICE FOR TRANSMITTING SOUNDING REFERENCE SIGNAL

This application claims the benefit of Chinese Patent Application No. 200910080779.1, filed with the State Intellectual Property Office of China on Mar. 27, 2009 and entitled "METHOD AND DEVICE FOR TRANSMITTING SOUNDING REFERENCE SIGNAL" and the benefit of Chinese Patent Application No. 200910134938.1, filed with the State Intellectual Property Office of China on Apr. 25, 2009 and entitled "METHOD AND DEVICE FOR TRANSMITTING SOUNDING REFERENCE SIGNAL", both of which are hereby incorporated by reference in their entireties.

FIELD OF THE INVENTION

The present invention relates to the field of wireless communications and particularly to a method and device for transmitting a sounding reference signal.

BACKGROUND OF THE INVENTION

The International Telecommunications Union (ITU) has proposed highly rigorous requirements for the performance of the next-generation mobile communication system of International Mobile Telecommunications-Advanced (IMT-A). For example, the maximum transmission bandwidth of the system shall be up to 100 MHz, peak rates of uplink and downlink data transmission shall be up to 1 Gbps and 500 Mbps, and there is a very high demand proposed for the average spectrum efficiency, particularly the edge spectrum efficiency, of the system. In order to satisfy the requirements on the new system of IMT-Advanced, the $3^{rd}$ Generation Partnership Project (3GPP) has proposed in the next-generation mobile cellular communication system of LTE-Advanced (Long Term Evolution-Advanced) the use of multi-point coordinated transmission to improve the performance of the system. Multi-point coordinated transmission refers to coordination among a plurality of geographically separate transmission points, which typically are base stations of different cells. Multi-point coordinated transmission is divided into downlink coordinated transmission and uplink joint reception. Solutions of downlink multi-point coordinated transmission are generally divided into joint scheduling and joint transmission. Joint scheduling refers to coordination of time, frequency and space resources among the cells so as to allocate orthogonal resources to different User Equipments (UEs) to thereby avoid interference to each other. Inter-cell interference is a dominating factor restricting the performance of a UE at the edge of a cell, therefore, joint scheduling can reduce inter-cell interference to thereby improve the performance of the UE at the edge of the cell.

Figure 1:
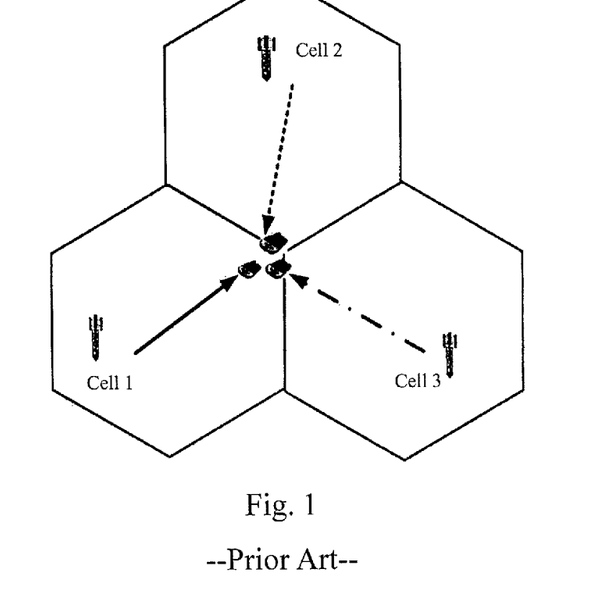
FIG. 1 is a schematic diagram of joint scheduling in the prior art.

FIG. 1 is a schematic diagram of joint scheduling, and as illustrated, joint scheduling refers to coordination of time, frequency and space resources among cells so as to allocate orthogonal resources to different UEs to thereby avoid interference to each other. Inter-cell interference is a dominating factor restricting the performance of a UE at the edge of a cell, therefore, joint scheduling can reduce inter-cell interference to thereby improve the performance of the UE at the edge of the cell. As illustrated in FIG. 1, three UEs possibly interfering with each other can be scheduled onto orthogonal resources (different resources are represented with different types of lines in the figure) through joint scheduling of three cells to thereby effectively avoid interference among the cells.

Figure 2:
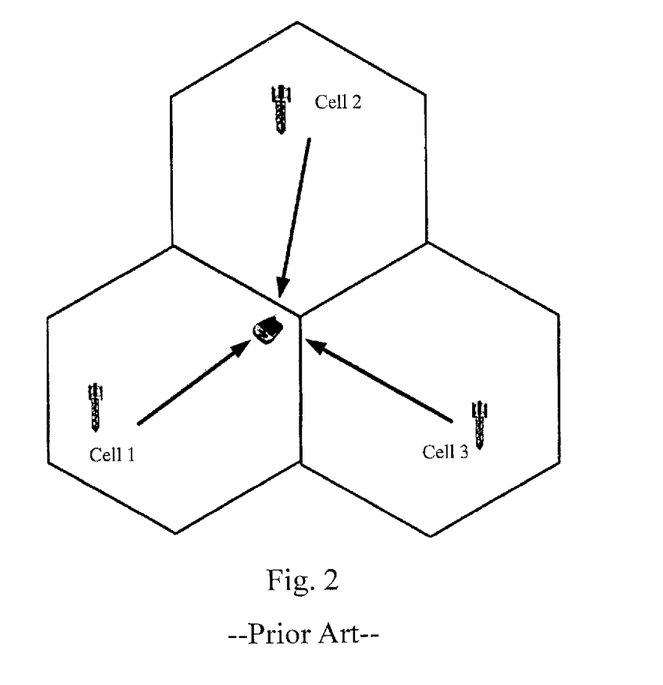
FIG. 2 is a schematic diagram of joint transmission in the prior art.

FIG. 2 is a schematic diagram of joint transmission, and as illustrated, data is transmitted concurrently from a plurality of cells to a UE in the joint transmission solution to enhance signals received by the UE as opposed to the joint scheduling solution in which data is transmitted from only one cell to a UE. As illustrated in FIG. 2, data is transmitted from three cells to a UE over the same resource, and the UE receives signals of the cells concurrently. Superposition of useful signals from the cells can improve the quality of the signals received by the UE on one hand and reduce interference to the UE to thereby improve the performance of the system on the other hand.

Figure 3:
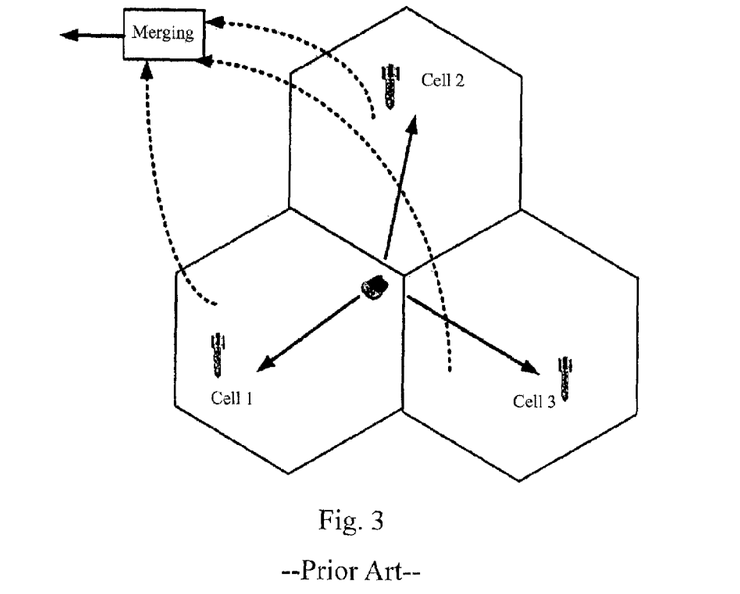
FIG. 3 is a schematic diagram of uplink joint reception in the prior art.

FIG. 3 is a schematic diagram of uplink joint reception, and as illustrated, uplink joint reception refers to concurrent reception of data transmitted from a UE by a plurality of cells and joint processing of data received by the cells to improve the quality of demodulating the UE data.

In the LTE system, a UE transmits an uplink Sounding Reference Signal (SRS) over time and frequency resources specified by an anchor cell. A base station estimates, according to the SRS signal transmitted from the UE and a signal received by the base station, information of a channel from the UE to the base station as a criterion for uplink scheduling in the frequency domain, selection of Modulation and Coding Scheme (MCS) and allocation of a resource. For a Time Division Duplex (TDD) system, the base station may calculate a weighting vector of downlink beam forming according to acquired unlink channel information. An SRS resource in the LTE system is allocated per cell so that resources of UEs in a cell are orthogonal to each other and SRSs of adjacent cells may be configured to be transmitted in different subframes. Furthermore, a sequence transmitted from a UE is specified by a cell. Therefore, there is such a drawback in the prior art that channels of a plurality of cells can not be sounded concurrently in the LTE-A system.

SUMMARY OF THE INVENTION

The invention provides a method and device for transmitting a sounding reference signal to address the problem in the prior art that a UE can not sound concurrently a plurality of cells.

An embodiment of the invention provides a method for transmitting an SRS, which includes the steps of:

allocating, in at least two cells for which uplink channels are to be sounded by a User Equipment, UE, an SRS resource for sounding each of the cells to the UE; and instructing the UE to transmit an SRS over the allocated SRS resource.

An embodiment of the invention further provides a base station including:

a resource allocation module configured to allocate, in at least two cells for which uplink channels are to be sounded by a UE, an SRS resource for sounding each of the cells to the UE; and an instruction module configured to instruct the UE to transmit an SRS over the allocated SRS resource.

An embodiment of the invention further provides a base station including any one or combination of a coordinated scheduling response unit, a resource provision unit and a shared information acquisition unit, wherein:

the coordinated scheduling response unit is configured to allocate an SRS resource to a UE hosted by another base station in response to a coordinated scheduling request from the another base station for SRS resource allocation;

the resource provision unit is configured to provide another base station with an SRS resource allocated to a UE hosted by the another base station in response to an SRS resource provision request from the another base station; and the shared information acquisition unit is configured to acquire, from another base station, information of an SRS resource allocated to a UE by the another base station.

An embodiment of the invention further provides a wireless access network system including a first base station and at least two second base stations, wherein:

the first base station is a base station of an anchor cell of a UE; and the second base stations are base stations of cells for which uplink channels are to be sounded by the UE;

the first base station comprises:

a resource allocation module configured to allocate an SRS resource for sounding each of cells to the UE; and an instruction module configured to instruct the UE to transmit an SRS over the allocated SRS resource.

An embodiment of the invention further provides a user equipment including:

a reception module configured to receive information of SRS resources allocated to the UE by a base station; and a transmission module configured to transmit SRSs over the SRS resources allocated to the UE by the base station.

An embodiment of the invention further provides a method for processing an SRS resource, which includes the steps of:

determining an SRS resource to be allocated to a UE; and allocating the SRS resource to the UE in UpPTS of a special sub-frame.

An embodiment of the invention further provides a base station including:

a resource determination module configured to determine an SRS resource to be allocated to a UE; and an allocation module configured to allocate the SRS resource to the UE in UpPTS of a special sub-frame.

Advantageous effects of the invention are as follows:

Since in the implementation of the invention firstly an SRS resource for sounding each of cells is allocated to a UE in at least two cells for which uplink channels are to be sounded by the UE and the UE is instructed to transmit an SRS over the allocated SRS resource. With such processes, resources for uplink SRSs are allocated to a UE by a set of sounded cells of the UE so that the UE can sound channels of a plurality of cells for the purpose of multi-point coordinated transmission to avoid that the UE feeds back information of channels of the cells and thus alleviate a feedback overhead of the UE and improve the performance of a system.

DETAILED DESCRIPTION OF THE EMBODIMENTS

Embodiments of the invention are described hereinafter with reference to the drawings.

The inventors have identified during making of the invention that information of channels from a UE to a plurality of cells is a predominant factor influencing the performance of a system in multi-point coordinated transmission. On one hand, scheduling and selection of MCS shall be performed according to uplink channels from the UE to the plurality of cells for uplink joint reception. On the other hand, if the UE may sound the uplink channels of the plurality of cells, information of downlink channels may be acquired directly in view of interchangeability between the uplink and downlink channels in a TDD system to thereby dispense with a considerable feedback load of the UE. As can be apparent, in order to improve the performance of the system or dispense with the feedback load of the UE, a key is how to enable the UE to sound the channels of the plurality of cells concurrently, and to this end, uplink channel sounding solutions applicable to multi-point coordinated transmission are proposed according to embodiments of the invention.

Figure 4:
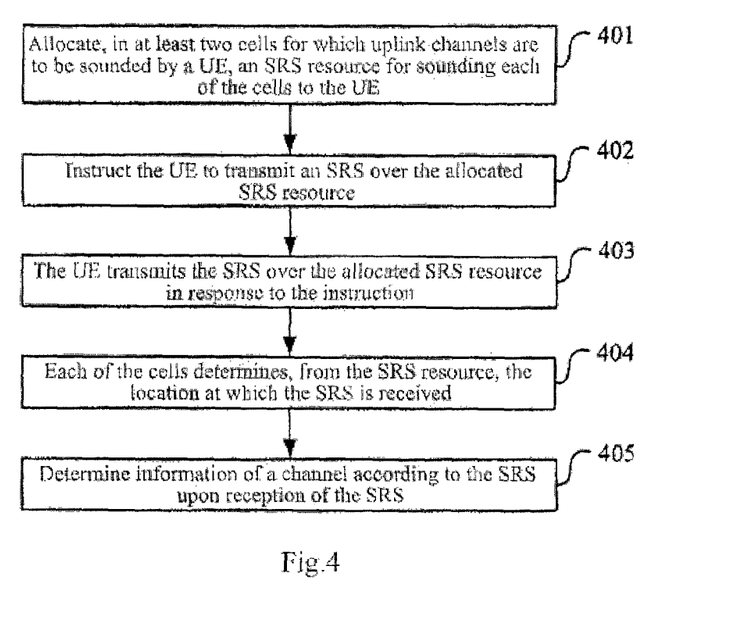
FIG. 4 is a schematic flow chart of a method for transmitting an SRS according to an embodiment of the invention.

FIG. 4 is a schematic flow chart of a method for transmitting an SRS, and as illustrated, the process of transmitting an SRS may include the following steps.

The step S401 is to allocate, in at least two cells for which uplink channels are to be sounded by a UE, an SRS resource for sounding each of the cells to the UE.

The step S402 is to instruct the UE to transmit an SRS over the allocated SRS resource.

A prerequisite for a UE to sound channels of a plurality of cells concurrently is the possibility to indicate to the UE the locations of resources over which the UE transmits SRSs, and in the foregoing process, the corresponding SRS resources are allocated after the cells to be sounded are determined, and then the UE is instructed to transmit SRSs over the resources so that a condition can be satisfied for the UE to sound the channels of the cells concurrently.

Specifically, the following steps may further be included for complete sounding of the cells.

In the step S403, the UE transmits the SRS over the allocated SRS resource in response to the instruction.

In this step, the UE transmits the uplink SRS at the specified location of the resource in response to the instruction.

In the step 404, each of the cells determines, from the SRS resource, the location at which the SRS is received.

In this step, a cell in a set of sounded cells C may receive the SRS at the corresponding location of the resource.

The step S405 is to determine information of a channel according to the SRS upon reception of the SRS.

In this step, a cell in the set of sounded cells C may estimate information of a channel from the UE to the cell according to the received SRS upon reception of the SRS at the corresponding location of the resource.

Thus the UE can sound the channels of the cells concurrently, and specific implementations of the respective steps are described below.

The step 401 may be performed by firstly determining the at least two cells for which uplink channels are to be sounded by the UE, and in an implementation, assumed the cells to be sounded by the UE constitute a set of sounded cells represented a set of sounded cells C, then the UE and a network may determine the set of sounded cells C by determining the cells for which uplink channels are to be sounded by the UE according to an average value of the strengths of pilot signals during a period of time and/or a time delay of synchronization signals. The set of sounded cells C may be determined by both a device at the network side and the UE, or determined by one of them and notified to the other one. The following approaches may be adopted in a specific implementation.

In one approach, the UE measures the strengths of pilot signals of surrounding cells and/or detects a time delay of synchronization signals and feeds back them to the device at the network side, and the device at the network side determines a set of sounded cells C according to an average value of the strengths of the pilot signals during a period of time and/or the time delay of the synchronization signals fed back from the UE and then notifies the UE of information of the set of sounded cells C.

In another approach, the UE determines a set of sounded cells C according to an average value of the strengths of pilot signals during a period of time and/or a time delay of synchronization signals and then notifies the network of information of the set of sounded cells C.

Obviously, the set of sounded cells C may vary with a varying demand for multi-point coordinated transmission and therefore is a slowly changing set of cells and may be updated periodically. The number of elements in the set of sounded cells C is represented as N which is not larger than a network preset value M.

Allocating an SRS resource for sounding each of the cells to the UE in the step 401 may be performed in any one or combination of the following approaches.

1. An SRS resource is allocated to the UE in a way that base stations of the cells allocate the same SRS resource to the UE.

The use of the same SRS resource can enable the UE to sound all of the cells by transmitting an SRS only once, and this approach is simple and power-saving for the UE.

2. An SRS resource allocated to the UE is an SRS resource determined by each of the cells for allocation to the UE.

This approach with allocation of an SRS resource to each of the cells improves the prior art by enabling the UE to sound the channels of the cells and is superior to the first approach by providing flexible scheduling at the network side, i.e., without requiring all of the cells to allocate the same resource to the UE.

3. An anchor cell of the UE allocates an SRS resource to the UE, and resource information of the SRS resource is shared by all of the base stations of the cells.

In the approach with the information of the SRS resource being shared, the UE may sound the cells by transmitting the SRS only once, and an advantage over the first and second approaches is that the SRS resources can be saved, that is, an SRS resource of only one cell is occupied by the UE.

The foregoing three approaches will be described below respectively in a first embodiment, a second embodiment and a third embodiment, and a repeated description thereof is omitted here.

After the SRS resource for sounding each of the cells is allocated to the UE, the base station of the anchor cell of the UE or the base stations of other cells may notify the UE of the SRS resource allocated to the UE through higher-layer signaling.

In the foregoing approaches, the SRS resource may be arranged in UpPTS (Uplink Pilot Time Slot) of the special sub-frame. An Orthogonal Frequency Division Multiplex (OFDM) symbol in the UpPTS may be an extended CP (Cyclic Prefix).

As can be defined in a TDD system, resources allocated by all of the cells to the UE are arranged in UpPTS of the special sub-frame and an extended CP is used in UpPTS, and a normal CP or an extended CP may be used in a normal uplink sub-frame.

In an implementation, the SRS is put in UpPTS primarily for the purpose of utilizing the extended CP because the length of a CP is strictly restricted for a signal transmitted in the uplink to the cells and inter-code interference may arise in some application scenarios if the normal CP is used. The same length of CPs for symbols in a sub-frame is required in an existing system, that is, if the SRS resource used in the embodiment of the invention is arranged in a normal sub-frame, a long CP is required for all of the symbols in the sub-frame, which results in a waste of the resources.

Furthermore, as configured in the existing system, there are two OFDM symbols at most in UpPTS, and if both of the symbols are arranged as extended CPs, this will alleviate a waste of the resources. There is another purpose that the scheduling algorithm may be executed simply if the SRS resource is arranged in UpPTS.

In view of the foregoing discussion, embodiments of the invention further provide a method for processing an SRS resource and a base station.

Figure 5:
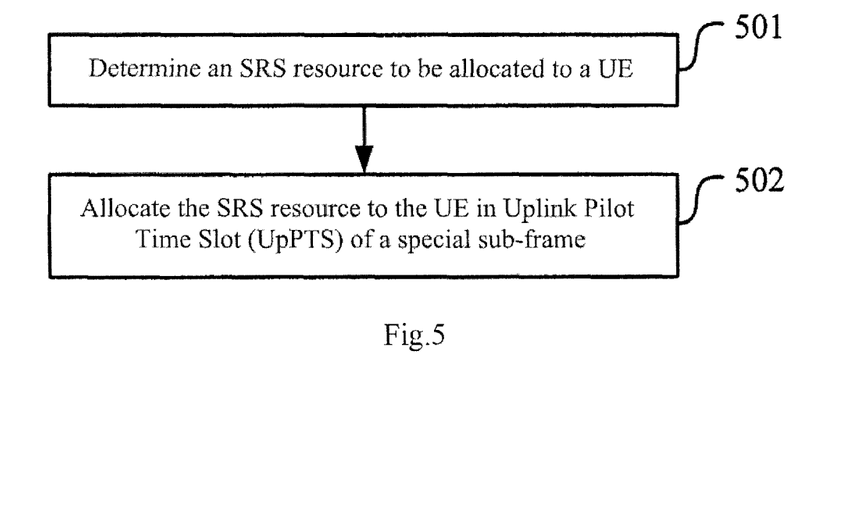
FIG. 5 is a schematic flow chart of a method for processing an SRS resource according to an embodiment of the invention.

FIG. 5 is a schematic flow chart of a method for processing an SRS resource, and as illustrated, the method may include the following steps.

The step 501 is to determine an SRS resource to be allocated to a UE.

The step 502 is to allocate the SRS resource to the UE in UpPTS of a special sub-frame.

In an implementation, an OFDM symbol in UpPTS is an extended CP.

Figure 6:
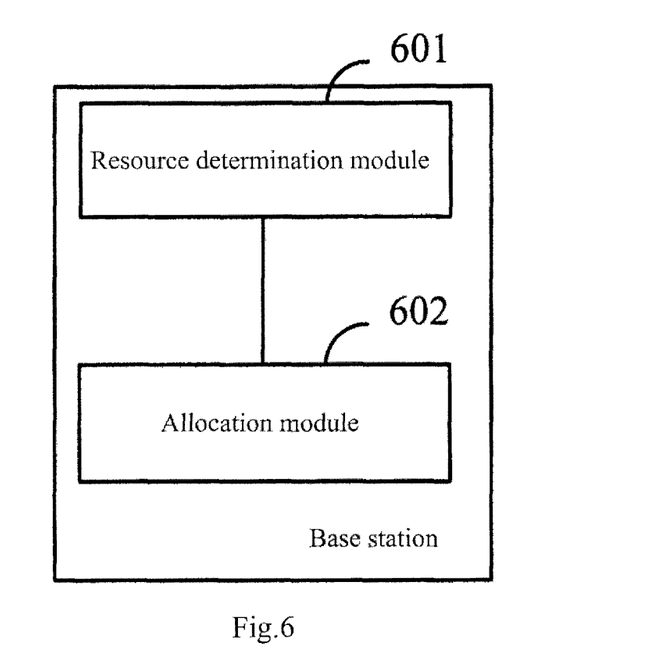
FIG. 6 is a schematic structural diagram of a base station according to an embodiment of the invention.

FIG. 6 is a schematic structural diagram of a base station, and as illustrate, the base station may include:

a resource determination module 601 configured to determine an SRS resource to be allocated to a UE; and an allocation module 602 configured to allocate the SRS resource to the UE in UpPTS of a special sub-frame.

In an implementation, the allocation module may further be configured to arrange an OFDM symbol in UpPTS as an extended CP.

A description is presented below in three embodiments.

The First Embodiment

Figure 7:
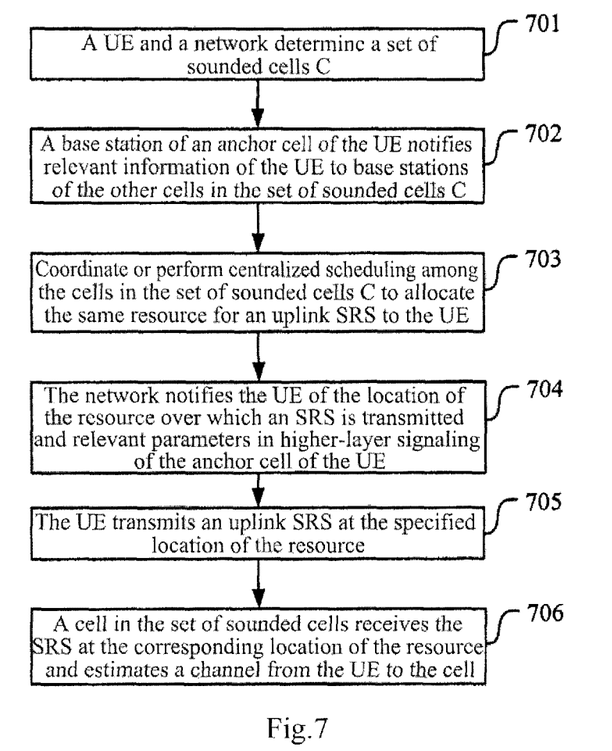
FIG. 7 is a schematic flow chart of sounding with the same SRS resource in all of cells according to an embodiment of the invention.

FIG. 7 is a schematic flow chart of sounding with the same SRS resource in all of cells, and as illustrated, the present embodiment relates to such an implementation that an SRS resource allocated to a UE is the same SRS resource in all of cells.

In the step 701, a UE and a network determine a set of sounded cells C.

For example, the UE measures and feeds back to the network side the strengths of pilot signals of surrounding cells and/or detects a time delay of synchronization signals; and the network side determines a set of sounded cells C according to an average value of the strengths of the pilot signals during a period of time and/or the time delay of the synchronization signals fed back from the UE and then notifies the UE of information of the set of sounded cells C. In another implementation, the UE determines a set of sounded cells C according to an average value of the strengths of pilot signals during a period of time and/or the time delay of the synchronization signals and then notifies the network of information of the set of sounded cells C. The set of sounded cells C is a slowly changing set of cells and updated periodically. The number of elements in the set of sounded cells C is represented as N which is not larger than a network preset value M.

A set of sounded cells C may be determined in the following second and third embodiments as in the first embodiment, and a repeated description thereof will be omitted below.

In the step 702, a base station of an anchor cell of the UE notifies relevant information of the UE to base stations of the other cells in the set of sounded cells C.

The relevant information includes relevant parameters of an SRS sequence to be used by the UE, e.g., a basic sequence in use, and transmission power.

The step 703 is to coordinate or perform centralized scheduling among the cells in the set of sounded cells C to allocate the same resource for an uplink SRS to the UE.

In the step 704, the network notifies the UE of the location of the resource over which an SRS is transmitted and relevant parameters through higher-layer signaling of the anchor cell of the UE.

In the step 705, the UE transmits an uplink SRS at the specified location of the resource.

In the step 706, a cell in the set of sounded cells receives the SRS at the corresponding location of the resource and estimates a channel from the UE to the cell.

Also as can be defined in a TDD system, the resource allocated by all of the cells to the UE is arranged in UpPTS of the special sub-frame and an extended CP is used in UpPTS, and a normal CP or an extended CP may be used for a normal uplink sub-frame.

The Second Embodiment

Figure 8:
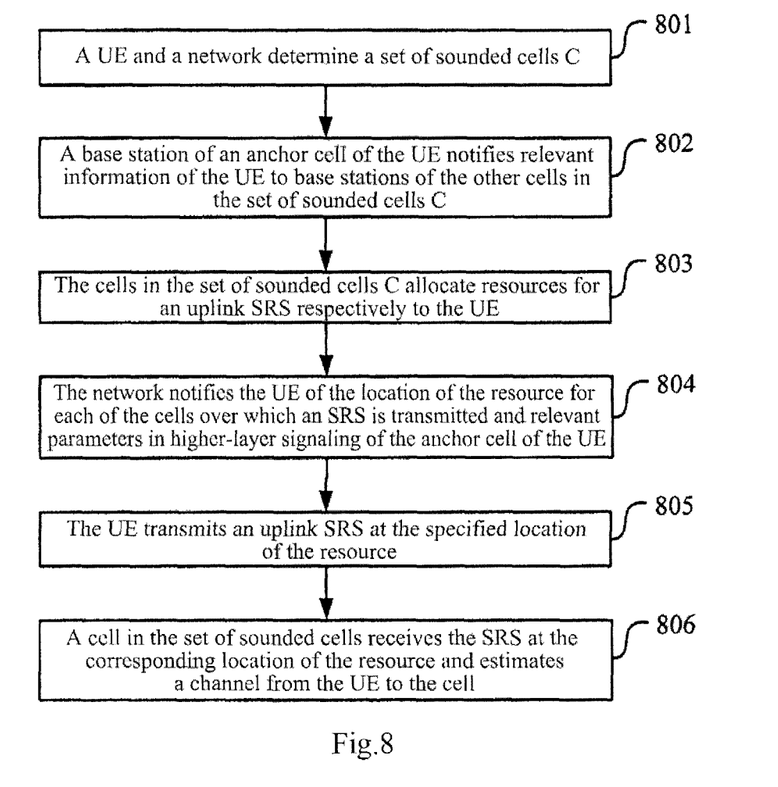
FIG. 8 is a schematic flow chart of sounding with SRS resources being determined respectively in cells according to an embodiment of the invention.

FIG. 8 is a schematic flow chart of sounding with SRS resources being determined respectively in cells, and as illustrated, the present embodiment relates to such an implementation that SRS resources allocated to a UE are SRS resources determined for the UE respectively in the cells.

In the step 801, a UE and a network determine a set of sounded cells C.

In the step 802, a base station of an anchor cell of the UE notifies relevant information of the UE to base stations of the other cells in the set of sounded cells C.

The relevant information includes relevant parameters of an SRS sequence to be used by the UE, e.g., a basic sequence in use, and transmission power.

In the step 803, the cells in the set of sounded cells C allocate resources for an uplink SRS respectively to the UE.

In the step 804, the network notifies the UE of the location of the resource for each of the cells over which an SRS is transmitted and relevant parameters through higher-layer signaling of the anchor cell of the UE.

In the step 805, the UE transmits an uplink SRS at the location of the resource specified by each of the cells.

In the step 806, a cell in the set of sounded cells receives the SRS at the corresponding location of the resource and estimates a channel from the UE to the cell.

As can be defined in a TDD system, the resource allocated by each of the cells to the UE is arranged in UpPTS of the special sub-frame and an extended CP is used in UpPTS, and a normal CP or an extended CP may be used for a normal uplink sub-frame.

The Third Embodiment

Figure 9:
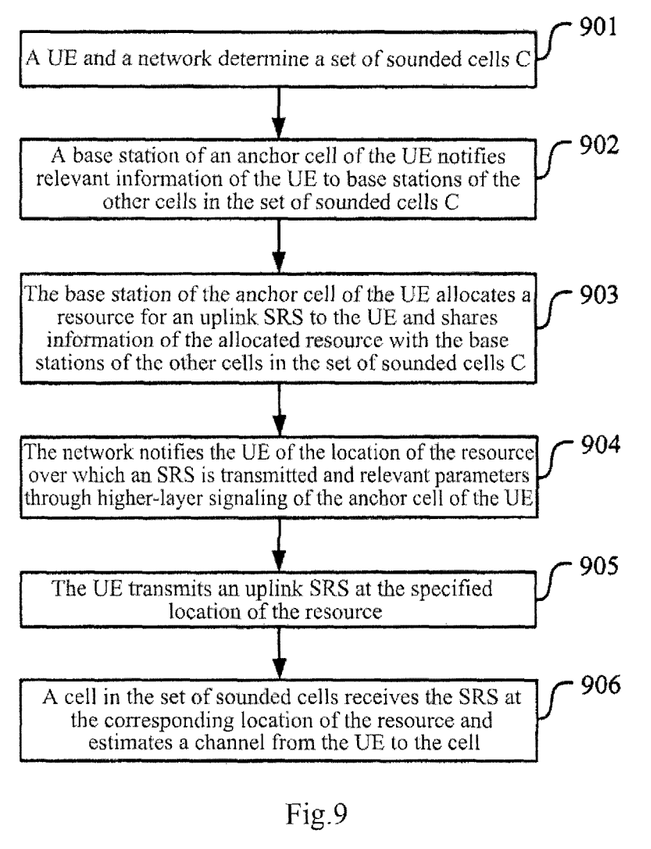
FIG. 9 is a schematic flow chart of sounding with information of an SRS resource being shared by all of cells according to an embodiment of the invention.

FIG. 9 is a schematic flow chart of sounding with information of an SRS resource being shared by all of cells, and as illustrated, the present embodiment relates to such an implementation that an SRS resource allocated to a UE is an SRS resource with resource information being shared by all of cells.

In the step 901, a UE and a network determine a set of sounded cells C.

In the step 902, a base station of an anchor cell of the UE notifies relevant information of the UE to base stations of the other cells in the set of sounded cells C.

The relevant information includes relevant parameters of an SRS sequence to be used by the UE, e.g., a basic sequence in use, and transmission power.

In the step 903, the base station of the anchor cell of the UE allocates a resource for an uplink SRS to the UE and shares information of the allocated resource with the base stations of the other cells in the set of sounded cells C.

In the step 904, the network notifies the UE of the location of the resource over which an SRS is transmitted and relevant parameters through higher-layer signaling of the anchor cell of the UE.

In the step 905, the UE transmits an uplink SRS at the specified location of the resource.

In the step 906, a cell in the set of sounded cells receives the SRS at the specified location of the resource and estimates a channel from the UE to the cell.

As can be defined in a TDD system, the resource allocated to the UE for all of the cells is arranged in UpPTS of the special sub-frame and an extended CP is used in UpPTS, and a normal CP or an extended CP may be used for a normal uplink sub-frame.

Based upon the same inventive concept, embodiments of the invention further provide a base station and a wireless access network system, and since these devices address the problem under the same principle as the method for transmitting an SRS, reference can be made to the implementations of the method for implementations of these devices, and a repeated description thereof will be omitted here.

Embodiments of the invention provide base stations in two operation statuses, a base station of an anchor cell of a UE intended to sound uplink channels of a plurality cells is referred to as a first base station in the embodiments and a base station of a cell, for which an uplink channel is to be sounded by the UE but which is not the anchor cell of the UE, is referred to as a second base station in the embodiments. The following description complies with such denominations.

Figure 10:
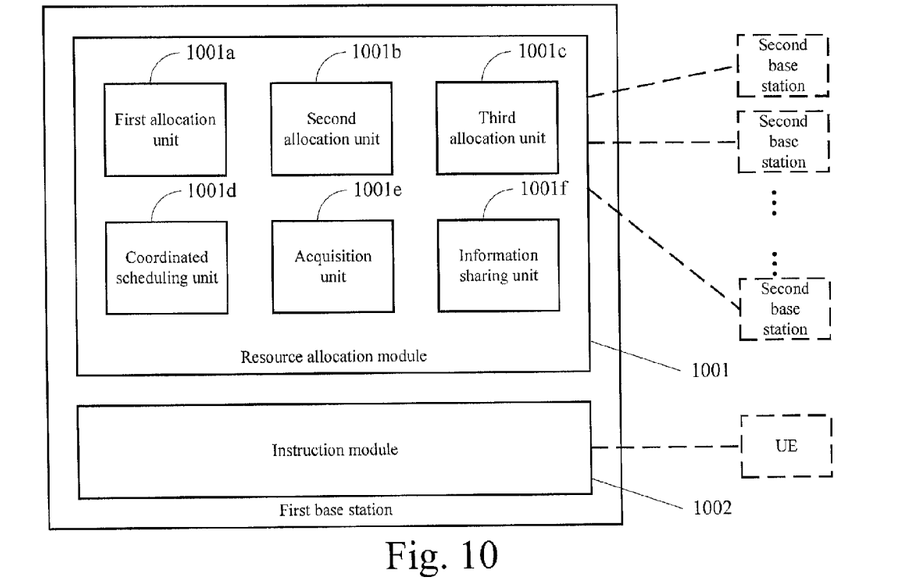
FIG. 10 is a schematic structural diagram of a first base station according to an embodiment of the invention.

FIG. 10 is a schematic structural diagram of a first base station, and as illustrated, the base station may include:

a resource allocation module 1001 configured to allocate, in at least two cells for which uplink channels are to be sounded by a UE, an SRS resource for sounding each of the cells to the UE; and an instruction module 1002 configured to instruct the UE to transmit an SRS over the allocated SRS resource.

In an implementation, the resource allocation module 1001 may include any one or combination of the following units:

a first allocation unit 1001a configured to allocate an SRS resource to the UE in a way that base stations of the cells allocate the same SRS resource to the UE;

a second allocation unit 1001b configured to allocate to the UE SRS resources, each of which is an SRS resource determined for each of the cells for allocation to the UE; and a third allocation unit 1001c configured to allocate to the UE an SRS resource, of which resource information is shared by the base stations of all of the cells.

In a specific implementation, the resource allocation module 1001 may further include the following unit together with the first allocation unit 1001a:

a coordinated scheduling unit 1001d configured to perform coordinated scheduling with the base stations of the cells for which uplink channels are to be sounded by the UE so that the SRS resources allocated to the UE by the base stations of all of the cells are the same.

The resource allocation module 1001 may further include the following unit together with the second allocation unit 1001b:

an acquisition unit 1001e configured to acquire, from a base station of each of the cells for which uplink channels are to be sounded by the UE, an SRS resource determined for the UE by the base station.

The resource allocation module 1001 may further include the following unit together with the third allocation unit 1001c:

an information sharing unit 1001f configured to share information of the SRS resource allocated to the UE with the base stations of the cells for which uplink channels are to be sounded by the UE.

In an implementation, the resource allocation module 1001 may further be configured to notify the UE of the SRS resource allocated to the UE through higher-layer signaling after allocating the SRS resource for sounding each of the cells to the UE.

The resource allocation module 1001 may further be configured to determine the cells for which uplink channels are to be sounded by the UE according to an average value of the strengths of pilot signals during a period of time and/or a time delay of synchronization signals.

In an implementation, the resource allocation module 1001 may further be configured to arrange the allocated SRS resource in UpPTS of a special sub-frame.

The resource allocation module 1001 may further be configured to arrange an OFDM symbol in UpPTS as an extended CP.

Figure 11:
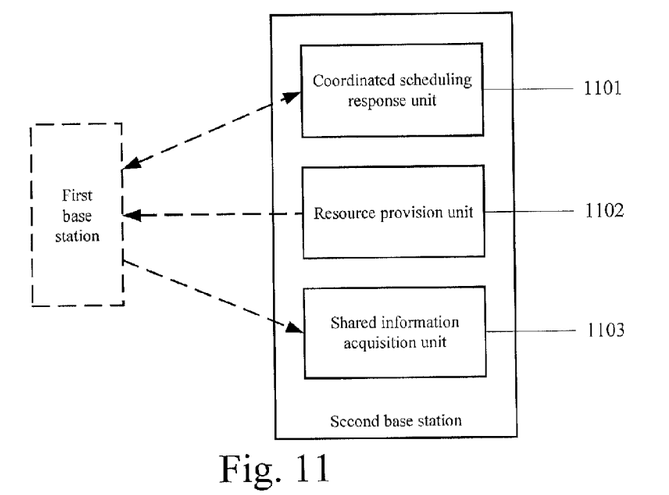
FIG. 11 is a schematic structural diagram of a second base station according to an embodiment of the invention.

FIG. 11 is a schematic structural diagram of a second base station, and as illustrated, the second base station may include any one or combination of a coordinated scheduling response unit 1101, a resource provision unit 1102 and a shared information acquisition unit 1103.

The coordinated scheduling response unit 1101 is configured to allocate an SRS resource to a UE hosted by another base station in response to a coordinated scheduling request from the another base station for SRS resource allocation.

The resource provision unit 1102 is configured to provide another base station with an SRS resource allocated to a UE hosted by the another base station in response to an SRS resource provision request from the another base station.

The shared information acquisition unit 1103 is configured to acquire, from another base station, information of an SRS resource allocated to a UE by the another base station.

Obviously, the second base station is intended to cooperate with the first base station, and the hosted cell of the second base station also requires a UE residing in a cell hosted by the first base station to sound an uplink channel.

A wireless access network system constituted of the first and second base stations will be described below.

Figure 12:
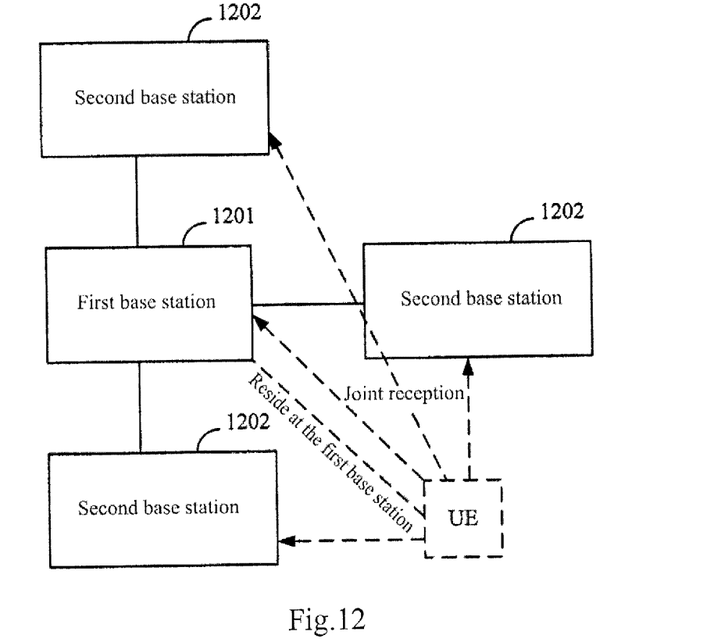
FIG. 12 is a schematic structural diagram of a wireless access network system according to an embodiment of the invention.

FIG. 12 is a schematic structural diagram of a wireless access network system, and as illustrated, the system may include a first base station 1201 and at least two second base stations 1202, and although there are three second base stations illustrated in the figure, a larger number of second base stations may be included in a practical application.

The first base station 1201 is a base station of an anchor cell of a UE.

The second base stations 1202 are base stations of cells for which uplink channels are to be sounded by the UE.

The first base station 1201 includes:

a resource allocation module configured to allocate an SRS resource for sounding each of cells to the UE; and an instruction module configured to instruct the UE to transmit an SRS over the allocated SRS resource.

In an implementation, the first and second base stations may operate in three modes dependent upon the different resource allocation module of the first base station under corresponding principles respectively to the first, second and third embodiments of the method as described above, and of course, these three operation modes may be implemented with reference to the implementations of the corresponding embodiments, and a repeated description thereof will be omitted here.

In the First Mode:

The resource allocation module of the first base station includes:

a first allocation unit configured to allocate an SRS resource to the UE, where the second base station allocates the same SRS resource to the UE; and a coordinated scheduling unit configured to transmit a coordinated scheduling request to the second base station for SRS resource allocation so that the SRS resource allocated to the UE is the same as that allocated by the second base station.

Then the second base station includes:

a coordinated scheduling response unit configured to allocate the same SRS resource to the UE hosted by the first base station in response to the coordinated scheduling request from the first base station for SRS resource allocation.

In the Second Mode:

The resource allocation module of the first base station includes:

a second allocation unit configured to allocate to the UE SRS resources, each of which is an SRS resource determined for each of the cells for allocation to the UE; and an acquisition unit configured to request the second base station for acquiring an SRS resource determined for the UE by the second base station.

Then the second base station includes:

a resource provision unit configured to provide the first base station with the SRS resource allocated to the UE hosted by the first base station in response to the SRS resource acquisition request from the first base station.

In the third mode:

The resource allocation module of the first base station includes:

a third allocation unit configured to allocate to the UE an SRS resource, of which resource information is shared by the base stations of all of the cells; and an information sharing unit configured to share information of the SRS resource allocated to the UE with the second base station.

Then the second base station includes:

a shared information acquisition unit configured to acquire from the first base station the information of the SRS resource allocated to the UE by the first base station.

For convenience of the description, the respective portions of the devices as described above have been functionally described respectively as various modules or units. Of course, the functions of the modules or units may be performed in the same or more than one software or hardware to implement the invention.

Figure 13:
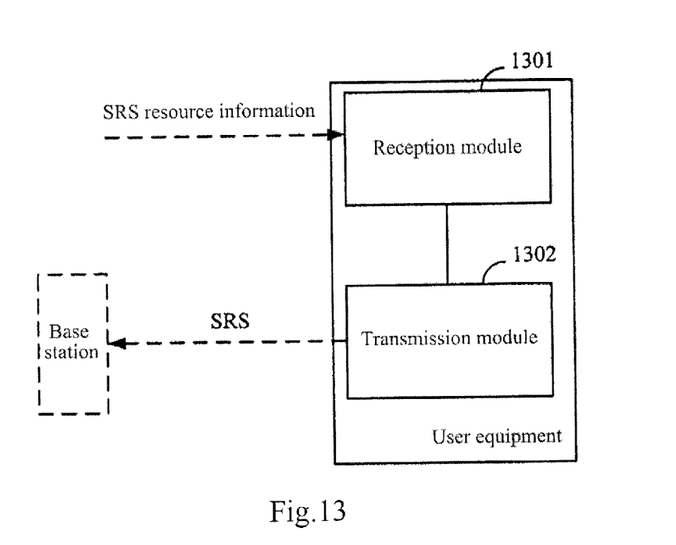
FIG. 13 is a schematic structural diagram of a user equipment according to an embodiment of the invention.

FIG. 13 is a schematic structural diagram of a user equipment, and as illustrated, the UE may include:

a reception module 1301 configured to receive information of SRS resources allocated to the UE by a base station; and a transmission module 1302 configured to transmit SRSs over the SRS resources allocated to the UE by the base station.

A process of transmitting an SRS is described below in specific instances.

Firstly technical means used in the specific instances are briefly described below.

1. Entity deciding an SRS resource

1) An anchor base station decides an SRS resource.

In this implementation, an anchor base station may determine the same or different SRS resources for all of the cells. The anchor base station may notify the allocated SRS resource to another cell after determining the SRS resources for all of the cells.

2) Each cell decides its own SRS resource.

In this implementation, the cells may exchange information of SRS resources after determining the SRS resources. In a specific implementation, after the information of the SRS resources are exchanged among the cells, the anchor base station or all of the cells may notify the UE of the information on allocation of these SRS resources by transmitting signals to the UE.

2. Whether an SRS resource is shared

1) The SRS resource is shared among all of the cells.

In this implementation, the SRS resource is the same in all of the cells.

2) No SRS resource is shared among the cells.

In this implementation, there are different SRS resources in different cells.

3. Approaches that a UE receives information of SRS resources

1) The UE receives information of the SRS resources from an anchor cell.

2) The UE receives information of the SRS resources from all of the cells.

Specifically:

(1) Each of the cells transmits a signal to the UE to notify the UE of a configured SRS resource. For example, the SRS resources are configured respectively by all of the cells, and then each of the cells transmits directly a signal to the UE to notify the UE of the configured SRS resource of the cell.

(2) All or a part (more than one) of the cells participate in transmitting signals to the UE to notify the UE of the configured SRS resources of all of the cells. The SRS resources of all of the cells may be the same or different.

Figure 14:
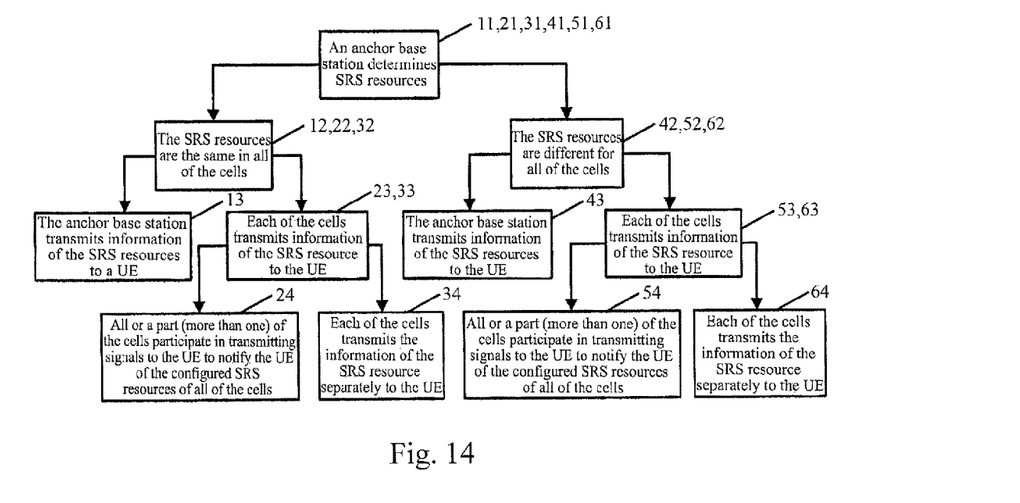
FIG. 14 is a schematic diagram of combined technical means for an anchor base station to determine an SRS resource according to an embodiment of the invention.
Figure 15:
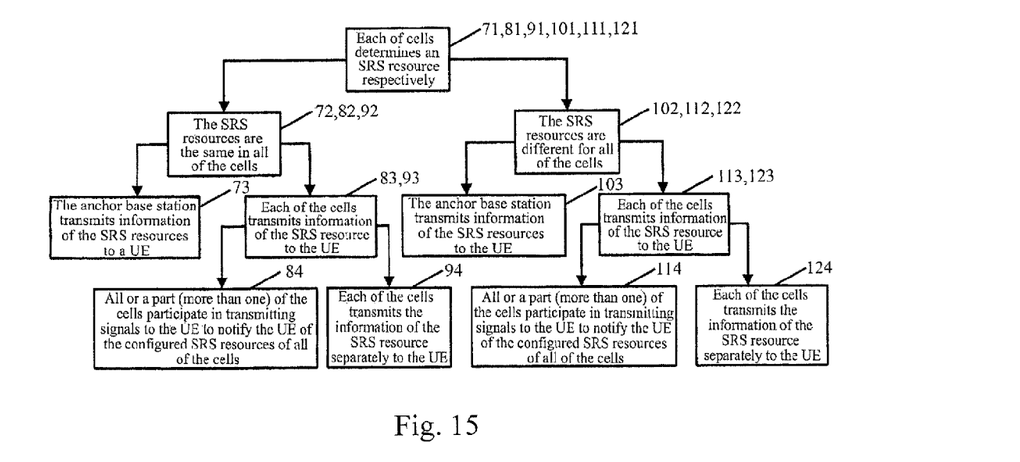
FIG. 15 is a schematic diagram of combined technical means for each of cells to determine an SRS resource according to an embodiment of the invention.

FIG. 14 is a schematic diagram of combined technical means for an anchor base station to determine an SRS resource, and FIG. 15 is a schematic diagram of combined technical means for each of cells to determine an SRS resource. As illustrated, technical means may be used in combination in the embodiments, where FIG. 14 is a schematic diagram combining the fourth to ninth embodiments and FIG. 15 is a schematic diagram combining the tenth to fifth embodiments.

The Fourth Embodiment

11. An anchor base station determines SRS resources.
12. The SRS resources are the same in all of the cells.
13. The anchor base station transmits information of the SRS resource to a UE.

The Fifth Embodiment

21. An anchor base station determines SRS resources.
22. The SRS resources are the same in all of the cells.
23. Each of the cells transmits information of the SRS resource to a UE.
24. Specifically, all or a part (more than one) of the cells participate in transmitting signals to the UE to notify the UE of the configured SRS resources of all of the cells.

The Sixth Embodiment

31. An anchor base station determines SRS resources.
32. The SRS resources are the same in all of the cells.
33. Each of the cells transmits information of the SRS resource to a UE.
34. Specifically, each of the cells transmits the information of the SRS resource separately to the UE.

The Seventh Embodiment

41. An anchor base station determines SRS resources.
42. The SRS resources are different for all of the cells.
43. The anchor base station transmits information of the SRS resources to a UE.

The Eighth Embodiment

51. An anchor base station determines SRS resources.
52. The SRS resources are different for all of the cells.
53. Each of the cells transmits information of the SRS resource to a UE.
54. Specifically, all or a part (more than one) of the cells participate in transmitting signals to the UE to notify the UE of the configured SRS resources of all of the cells.

The Ninth Embodiment

61. An anchor base station determines SRS resources.
62. The SRS resources are different for all of the cells.
63. Each of the cells transmits information of the SRS resource to a UE.
64. Each of the cells transmits the information of the SRS resource separately to the UE.

The Tenth Embodiment

71. Each of cells determines an SRS resource respectively.
72. The SRS resources are the same in all of the cells.
73. An anchor base station transmits information of the SRS resources to a UE.

The Eleventh Embodiment

81. Each of cells determines an SRS resource respectively.
82. The SRS resources are the same in all of the cells.

83. Each of the cells transmits information of the SRS resource to a UE.

84. Specifically, all or a part (more than one) of the cells participate in transmitting signals to the UE to notify the UE of the configured SRS resources of all of the cells.

The Twelfth Embodiment

91. Each of cells determines an SRS resource respectively.

92. The SRS resources are the same in all of the cells.

93. Each of the cells transmits information of the SRS resource to a UE.

94. Specifically, each of the cells transmits the information of the SRS resource separately to the UE.

The Thirteenth Embodiment

101. Each of cells determines an SRS resource respectively.

102. The SRS resources are different for all of the cells.

103. An anchor base station transmits information of the SRS resources to a UE.

The Fourteenth Embodiment

111. Each of cells determines an SRS resource respectively.

112. The SRS resources are different for all of the cells.

113. Each of the cells transmits information of the SRS resource to a UE.

114. Specifically, all or a part (more than one) of the cells participate in transmitting signals to the UE to notify the UE of the configured SRS resources of all of the cells.

The Fifteenth Embodiment

121. Each of cells determines an SRS resource respectively.

122. The SRS resources are different for all of the cells.

123. Each of the cells transmits information of the SRS resource to a UE.

124. Specifically, each of the cells transmits the information of the SRS resource separately to the UE.

As can be apparent from the foregoing embodiments, resources for uplink SRSs are allocated to a UE by a set of sounded cells of the UE so that the UE can sound channels of a plurality of cells for the purpose of multi-point coordinated transmission to thereby improve the performance of a system and alleviate a feedback load of the UE.

Specifically, the cells to be sounded by the UE allocate the resources for uplink SRSs to the UE, and then the UE transmits SRSs at the specified locations of the resources to thereby sound the cells.

When the cells in the set of sounded cells allocate the resources for uplink SRSs to the UE, coordination or centralized scheduling may be performed among the cells in the set of sounded cells to allocate the same resource for uplink SRSs to the UE; or each of the cells in the set of sounded cells may allocate a resource for an uplink SRS respectively to the UE; or an anchor cell of the UE may allocate a resource for an uplink SRS to the UE and share information of the allocated resource with the other cells in the set of sounded cells.

Furthermore, when the cells in the set of sounded cells allocate resources for uplink SRSs to the UE, the allocated resources may be arranged in UpPTS of the special subframe, and an OFDM symbol in UpPTS is an extended CP.

With the foregoing solution, resources for uplink SRSs are allocated to a UE by a set of sounded cells of the UE so that the UE can sound channels of a plurality of cells for the purpose of multi-point coordinated transmission to thereby avoid that the UE feeds back information of channels of the plurality of cells to alleviate a feedback overhead of the UE and improve the performance of a system.

Those skilled in the art shall appreciate that the embodiments of the invention may be embodied as a method, a system or a computer program product. Therefore, the invention may be embodied in the form of an all-hardware embodiment, an all-software embodiment or an embodiment of a combination of software and hardware. Furthermore, the invention may be embodied in the form of a computer program product embodied in one or more computer useable storage mediums (including but not limited to a disk memory, a CD-ROM, and an optical memory) in which computer useable program codes are contained.

The invention has been described in a flow chart and/or a block diagram of the method, device (system) and computer program product according to the embodiments of the invention. It shall be appreciated that respective steps and/or blocks in the flow chart and/or the block diagram and combinations of the steps and/or blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create apparatuses for performing the functions specified in the step(s) of the flow chart and/or the block(s) of the block diagram.

These computer program instructions may also be stored into a computer readable memory capable of directing the computer or the other programmable data processing device to operate in a specific manner so that the instructions stored in the computer readable memory create a product including instructions means which perform the functions specified in the step(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the step(s) of the flow chart and/or the block(s) of the block diagram.

Although the preferred embodiments of the invention have been described, those skilled in the art can make additional modifications and variations to these embodiments in light of the fundamental inventive concept. Therefore, the appended claim is intended to encompass the preferred embodiments and all of the modifications and variations coming into the scope of the invention.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for transmitting a Sounding Reference Signal, SRS, comprising:

allocating, in at least two cells for which uplink channels are to be sounded by a User Equipment, UE, an SRS resource for sounding each of the cells to the UE; and instructing the UE to transmit an SRS over the allocated SRS resource, wherein allocating the SRS resource for sounding each of the cells to the UE comprises any one or combination of the following approaches:

a) allocating an SRS resource to the UE in a way that base stations of the cells allocate the same SRS resource to the UE;

b) allocating to the UE SRS resources, each of which is an SRS resource determined for each of the cells for allocation to the UE; and c) allocating to the UE an SRS resource, of which resource information is shared by the base stations of all of the cells, wherein:

when the approach a) is used, the method further comprises: performing coordinated scheduling with the base stations of the cells for which uplink channels are to be sounded by the UE so that the SRS resources allocated to the UE by the base stations of all of the cells are the same; or when the approach b) is used, the method further comprises: acquiring, from an base station of each of the cells for which uplink channels are to be sounded by the UE, an SRS resource determined for the UE by the base station; or when the approach c) is used, the method further comprises: sharing information of the SRS resource allocated to the UE with the base stations of the cells for which uplink channels are to be sounded by the UE.

2. The method of claim 1, wherein after allocating the SRS resource for sounding each of the cells to the UE, a base station of the anchor cell of the UE or a base station of another cell notifies the UE of the SRS resource allocated to the UE through higher-layer signaling.

3. The method of claim 1, wherein the cells for which uplink channels are to be sounded by the UE are determined according to at least one of an average value of strengths of pilot signals during a period of time and a time delay of synchronization signals.

4. The method of claim 1, further comprising:
determining according to the SRS resource, by each of the cells, a location at which the SRS is received; and
determining information of a channel according to the SRS upon reception of the SRS.

5. A base station, comprising:
a resource allocation module configured to allocate, in at least two cells for which uplink channels are to be sounded by a UE, an SRS resource for sounding each of the cells to the UE; and
an instruction module configured to instruct the UE to transmit an SRS over the allocated SRS resource,
wherein the resource allocation module comprises any one or combination of the following sub-modules:
a first allocation sub-module configured to allocate an SRS resource to the UE in a way that base stations of the cells allocate the same SRS resource to the UE;
a second allocation sub-module configured to allocate to the UE SRS resources, each of which is an SRS resource determined for each of the cells for allocation to the UE; and
a third allocation sub-module configured to allocate to the UE an SRS resource, of which resource information is shared by the base stations of all of the cells, wherein:

when the resource allocation module comprises the first allocation sub-module, the resource allocation module further comprises: a coordinated scheduling sub-module configured to perform coordinated scheduling with the base stations of the cells for which uplink channels are to be sounded by the UE so that the SRS resources allocated to the UE by the base stations of all of the cells are the same: or when the resource allocation module comprises the second allocation sub-module, the resource allocation module further comprises: an acquisition sub-module configured to acquire, from an base station of each of the cells for which uplink channels are to be sounded by the UE, an SRS resource determined for the UE by the base station; or when the resource allocation module comprises the third allocation sub-module, the resource allocation module further comprises: an information sharing sub-module configured to share information of the SRS resource allocated to the UE with the base stations of the cells for which uplink channels are to be sounded by the UE;

wherein each of the first allocation sub-module, the second allocation sub-module, the third allocation sub-module, the coordinated scheduling sub-module, the acquisition sub-module, and the information sharing sub-module is implemented by one or more processors; and wherein the one or more processors is coupled to a memory.

6. The base station of claim 5, wherein the resource allocation module is further configured to notify the UE of the SRS resource allocated to the UE through higher-layer signaling after allocating the SRS resource for sounding each of the cells to the UE.

7. The base station of claim 5, wherein the resource allocation module is further configured to determine the cells for which uplink channels are to be sounded by the UE according to at least one of an average value of strengths of pilot signals during a period of time and a time delay of synchronization signals.

8. The base station of claim 5, wherein the base station is configured to cooperate with a further base station, the further base station comprising any one or combination of a coordinated scheduling response module, a resource provision module and a shared information acquisition module, wherein:

the coordinated scheduling response module is configured to allocate an SRS resource to a UE hosted by another base station in response to a coordinated scheduling request from the another base station for SRS resource allocation;

the resource provision module is configured to provide another base station with an SRS resource allocated to a UE hosted by the another base station in response to an SRS resource provision request from the another base station; and the shared information acquisition module is configured to acquire, from another base station, information of an SRS resource allocated to a UE by the another base station.

9. A wireless access network system, comprising a first base station and at least two second base stations, wherein:
the first base station is a base station of an anchor cell of a UE; and
the second base stations are base stations of cells for which uplink channels are to be sounded by the UE;
the first base station comprises:
a resource allocation module configured to allocate an SRS resource for sounding each of cells to the UE; and an instruction module configured to instruct the UE to transmit an SRS over the allocated SRS resource, wherein:

the resource allocation module of the first base station comprises: a first allocation sub-module configured to allocate an SRS resource to the UE, wherein the second base station allocates the same SRS resource to the UE; and a coordinated scheduling sub-module configured to transmit a coordinated scheduling request to the second base station for SRS resource allocation so that the SRS resource allocated to the UE is the same as that allocated by the first base station; and the second base station comprises: a coordinated scheduling response module configured to allocate the same SRS resource to the UE hosted by the first base station in response to the coordinated scheduling request from the first base station for SRS resource allocation: or the resource allocation module of the first base station comprises: a second allocation sub-module configured to allocate to the UE SRS resources, each of which is an SRS resource determined for each of the cells for allocation to the UE: and an acquisition sub-module configured to request the second base station for acquiring an SRS resource determined for the UE by the second base station: and the second base station comprises: a resource provision module configured to provide the first base station with the SRS resource allocated to the UE hosted by the first base station in response to the SRS resource acquisition request from the first base station; or the resource allocation module of the first base station comprises: a third allocation sub-module configured to allocate to the UE an SRS resource, of which resource information is shared by the base stations of all of the cells; and an information sharing sub-module configured to share information of the SRS resource allocated to the UE with the second base station: and the second base station comprises: a shared information acquisition module configured to acquire from the first base station the information of the SRS resource allocated to the UE b7 the first base station;

wherein each of the coordinated scheduling response module, the resource provision module, and the shared information acquisition module is implemented by one or more processors; and wherein the one or more processors is coupled to a memory.

* * * * *